United States Patent [19]
Peck

[11] 3,714,791
[45] Feb. 6, 1973

[54] VAPOR FREEZING TYPE DESALINATION METHOD AND APPARATUS

[75] Inventor: Ralph E. Peck, Chicago, Ill.

[73] Assignee: Pacific Lighting Service Company, Los Angeles, Calif.

[22] Filed: Feb. 25, 1971

[21] Appl. No.: 118,669

[52] U.S. Cl. .................................. 62/58, 62/123
[51] Int. Cl. ............................................. B01d 9/04
[58] Field of Search............. 62/123, 58, 67, 100, 268

[56] References Cited

UNITED STATES PATENTS

| | | | |
|---|---|---|---|
| 3,478,531 | 11/1969 | Karnofsky | 62/123 |
| 2,759,882 | 8/1956 | Worthen et al. | 62/268 X |
| 2,521,751 | 9/1950 | Sampson et al. | 62/100 X |
| 3,240,024 | 3/1966 | Ashley et al. | 62/58 |
| 3,266,261 | 8/1966 | Anderson | 62/52 |
| 3,535,210 | 10/1970 | Linde et al. | 62/52 X |

*Primary Examiner*—Meyer Perlin
*Assistant Examiner*—Ronald C. Capossela
*Attorney*—Christie, Parker & Hale

[57] ABSTRACT

A batch evaporative desalination method and apparatus having a pair of similar systems for substantially continuous output is described. Each system has three evacuated chambers in vapor communication with each other. In the first chamber, precooled seawater is sprayed for partial vaporization and consequent formation of ice crystals as latent heat is removed from the seawater. Ice crystals are permitted to accumulate in the first chamber and water vapor flows to a second chamber in which refrigeration coils, preferably cooled by cold natural gas, are maintained at a temperature below the triple point so that ice condenses thereon. After a selected interval, spraying of precooled seawater into the first chamber and refrigeration in the second chamber are stopped. Warmer seawater is then sprayed into a third chamber also maintained at low pressure so that a portion of the water vaporizes but without formation of ice in the brine. The water vapor flows to the first and second chambers and condenses on the ice therein to transfer latent heat for melting the ice. Fresh water is withdrawn from the second chamber. Fresh water in the first chamber percolates through the ice crystals for washing and when residual brine is removed, fresh water is withdrawn from this chamber also. In a preferred embodiment, natural gas refrigerant is expanded through a turbine for producing shaft horsepower for pumping seawater. The apparatus is arranged with hydraulic legs beneath the first and third chambers at a height at least equal to the head of water at one atmosphere pressure for maintaining low pressure in the three chambers. In a preferred arrangement, a reversible refrigeration loop may be provided between a pair of second chambers for reversibly transferring heat therebetween.

13 Claims, 1 Drawing Figure

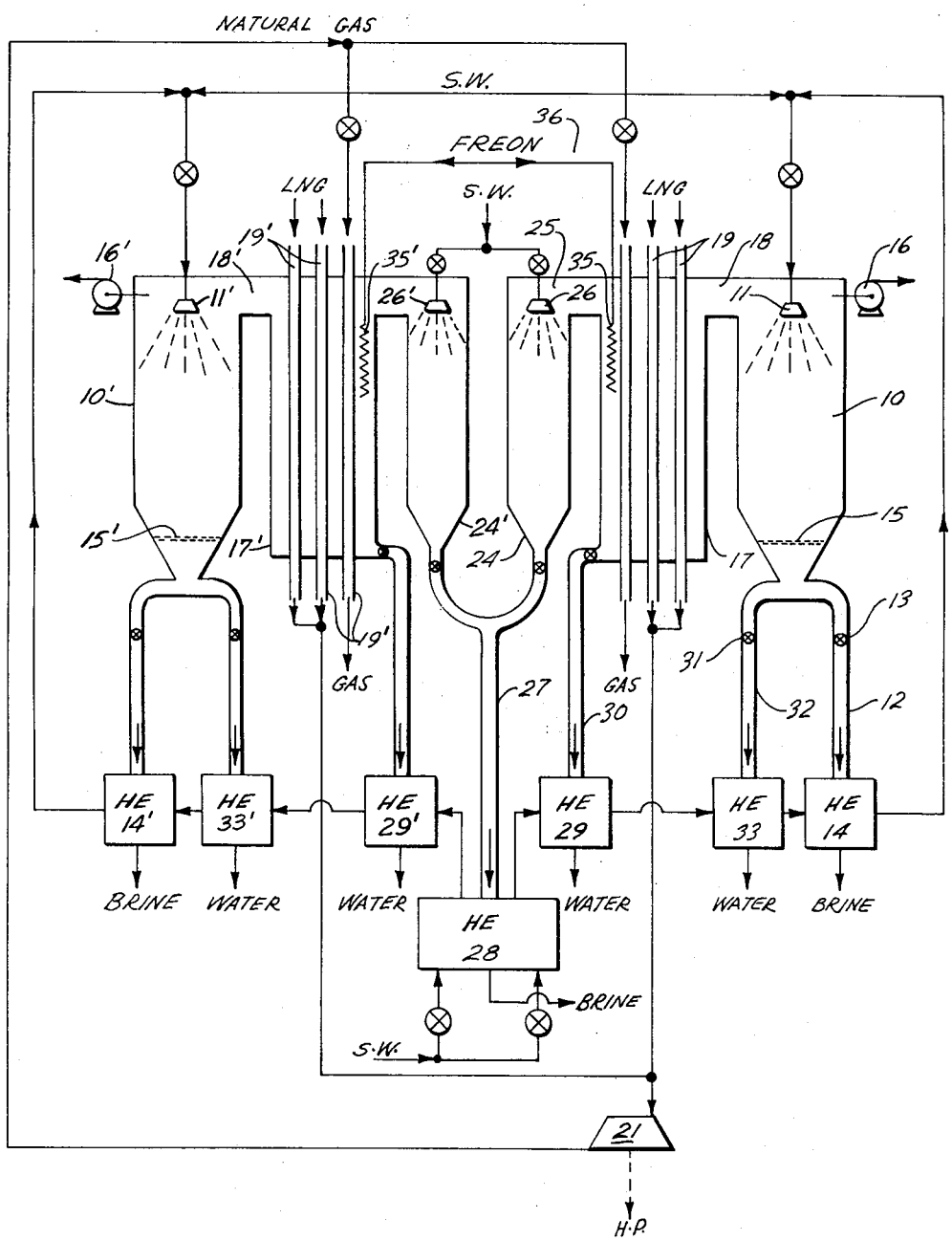

VAPOR FREEZING TYPE DESALINATION METHOD AND APPARATUS

BACKGROUND OF THE INVENTION

A significant and developing problem in many regions of the world is the availability of fresh water in large quantities. In many places, the cost of fresh water has become sufficiently high that recovery from seawater or other saline waters has become economical. Two broad techniques that involve change of phase of the water are available for recovery of fresh water from saline waters. In one of these techniques, fresh ice is formed and separated from concentrated brine and the separated ice is remelted to yield fresh water. In another process, fresh water vapor is distilled from saline water to produce fresh water and brine. In either of these processes, a relatively large amount of energy is required for causing the necessary phase changes.

In one arrangement, precooled saline water is evaporated to extract latent heat in the water vapor thereby producing ice crystals in the brine. After separating the ice crystals from brine and compressing the water vapor, they are brought back into contact to produce fresh water. Substantial amounts of energy are required for compressing the water vapor sufficiently to melt the ice crystals. In prior processes, the energy requirements have been high and it is therefore desirable to produce a desalination technique having low energy requirements for better economy.

BRIEF SUMMARY OF THE INVENTION

Thus, in practice of this invention according to a presently preferred embodiment, there is provided method and apparatus for cooling seawater, introducing the cooled seawater into a low pressure chamber to form water vapor, ice, and cold brine, and continuously freezing water vapor to form ice in a second chamber during the introducing step in a batch-type process. In a second stage of the operation, relatively warmer seawater is introduced into a low pressure region for forming water vapor and cold brine and the water vapor is contacted with the ice from the earlier operations for condensing the water vapor and melting the ice.

DRAWING

These and other features and advantages of this invention will be appreciated as the same becomes better understood by reference to the following detailed description when considered in connection with the accompanying drawing which illustrates semi-schematically a desalination apparatus and flow path in accordance with principles of this invention.

DESCRIPTION

As is well known when water is introduced into a chamber having a pressure below the triple point, evaporation of water vapor occurs with consequent extraction of latent heat from the remaining liquid. When the remaining liquid is at a sufficiently low temperature, this extraction of latent heat causes formation of ice crystals with up to about 7 pounds of ice being produced per pound of water vaporized. When water vapor is brought to a temperature below the triple point, it condenses to form ice. Contact of water vapor with ice at a temperature above the triple point may cause condensation of water vapor and melting of the ice due to transfer of the latent heat therebetween. The method and apparatus provided in practice of this invention employ a novel combination of these broad physical phenomena.

As illustrated in the drawing of a presently preferred embodiment, the apparatus employed in practice of this invention has at least two substantially similar portions, only one of which will be described in detail herein. The processes involved in this invention are batch processes and it is usually desirable to obtain substantially continuous performance of a system for optimum economy. In order to provide this continuity, it is preferred to employ at least a pair of operating systems which may operate at least partly in alternation to provide substantially continuous output. It will be apparent of course that a larger number of batch-type systems may be employed as desired in order to obtain additional operating economies.

Each half of the system illustrated in the drawing comprises a first or vacuum freezing chamber 10 which can take a number of selected shapes as may be suitable for a particular installation. A spray nozzle 11 near the upper portion of the vacuum freezing chamber 10 sprays precooled seawater SW into the chamber. At the bottom of the chamber, a conduit 12 controlled by a valve 13 conducts brine from the vacuum freezing chamber through a heat exchanger 14. The height of the bottom of the vacuum freezing chamber 10 above the brine outlet is at least high enough to equal the head of water corresponding to one atmosphere of pressure. In this way, if the brine outlet is left open and the chamber 10 is closed, a hydraulic head is maintained in the conduit 12 and the pressure above the head of water (or brine) in the conduit is the pressure of water vapor at the temperature of the system. A screen 15 near the bottom of the chamber retains ice formed therein. A pump 16 continuously removes residual non-condensible gases from the vacuum freezing chamber 10 so that the pressure therein is determined by the hydraulic leg in the conduit 12. Seawater SW pumped to the nozzle 11 through a plurality of heat exchangers HE, hereinafter mentioned in greater detail, is preferably deaerated by a conventional deaerator (not shown) before entering the illustrated system for minimizing the quantity of gases that must be removed from the chamber by the pump 16.

When precooled seawater is sprayed through the nozzle 11, or otherwise brought into the vacuum freezing chamber 10, water vapor is formed in the low pressure by flash evaporation. The removal of heat freezes a portion of the seawater and ice crystals accumulate in the bottom portion of the chamber. Brine concentrated by this extraction of water flows out through the conduit 12. It should be apparent to one skilled in the art, that, in lieu of employing a spray nozzle 11, other means for exposing relatively large amounts of surface area of saline water to the vacuum environment can be employed, such as, for example, by flowing the water over a plurality of baffles or by agitation of the surface of a pool of water.

A second or condensation chamber 17 is connected to the vacuum freezing chamber by a vapor conduit 18. The condensation chamber contains a multiplicity of refrigeration tubes 19 through which a refrigerant is passed to bring the temperature of the tubes well below the triple point of water. This low temperature of the refrigeration tubes 19 causes condensation of the water vapor produced in the vacuum freezing chamber 10. Continual formation of fresh water vapor in the vacuum freezing chamber and condensation of water vapor in the condensation chamber results in mass flow therebetween through conduit 18 without any auxiliary vapor pumps of the like.

In a preferred embodiment, the refrigerant passed through the tubes 19 comprises liquified natural gas or cold natural gas vaporized from liquified natural gas brought to the vicinity of the desalination station in large quantities. Liquefied natural gas is presently being transported in shipload quantities from gas-producing regions to gas utilizing regions. This liquified natural gas has a large refrigeration potential which has high utility in freeze-type desalination processes and it is highly advantageous to employ such liquified natural gas in an apparatus as described and illustrated herein. It will be apparent, however, that although the use of liquefied natural gas, either directly or after prior vaporization, provides a highly economical mode of refrigeration, conventional techniques can be employed if desired.

After passing through the refrigeration tubes 19, the natural gas in a preferred embodiment passes to a conventional expansion turbine 21 where expansion of the natural gas from its more dense state to its less dense state produces a substantial amount of shaft horsepower HP which is preferably employed in the various pumps required for practice of this invention. Any surplus shaft horsepower produced can readily be employed for generating electricity or other applications as may be apparent to one skilled in the art. Cold natural gas from the expansion turbine 21 is preferably passed through a portion of the refrigerant tubes 19 in the second chamber for freezing ice. If desired the natural gas can also be passed in heat exchange relation with incoming seawater in another heat exchanger (not shown). It will be apparent of course that multiple stage turbines or other similar arrangements may be employed if desired.

After the system has operated for an interval with precooled seawater sprayed into the vacuum freezing chamber 10 and water vapor condensing on the tubes 19, a bed of ice accumulates in the vacuum freezing chamber and the tubes 19 become coated with a substantial layer of ice, thereby reducing heat transfer efficiency. At this point, the flow of cold natural gas or other refrigerant through the tubes 19 is stopped as is the spraying of precooled seawater through the nozzle 11. Any residual brine in the bed of ice in a vacuum freezing chamber is drained off through the line 12. When the flow of refrigerant through the tubes 19 is cut off, it is preferred to switch such flow to the tubes 19' in the other half of the system to maintain substantially continuous flow and likewise the flow of precooled seawater is switched to the second vacuum freezing chamber 10'.

A third or evaporation chamber 24 is in fluid communication with the condensation chamber 17 and vacuum freezing chamber 10 by a vapor conduit 25. Relatively warmer seawater SW is sprayed into the evaporation chamber through a nozzle 26. The relatively warmer seawater may be at ambient temperature or may, for example, be discharged cooling water from some other process. In general, the incoming seawater into the evaporation chamber 24 is not precooled. At the bottom of the evaporation chamber is a conduit 27 leading to a heat exchanger 28 from which brine may be discharged. The conduit 27 is sufficiently high above its outlet that it will maintain a head of water corresponding to one atmosphere pressure and this hydraulic leg in the conduit 27 helps maintain a low ambient pressure equal to the water vapor pressure in the three chambers 10, 17 and 24.

As the relatively warmer seawater is sprayed into the low pressure evaporation chamber 24, a substantial portion of the seawater flash evaporates and the resultant somewhat cooled, concentrated brine passes through the conduit 27 for discharge from the system. The water vapor formed in the evaporation chamber 24 flows through the conduits 18 and 25 into the condensation and vacuum freezing chambers 17 and 10, respectively, without any requirement for vapor pumps or the like. This mass flow arises because the ice on the refrigeration tubes 19 and accumulated in a bed in the vacuum freezing chamber is at a substantially lower temperature and hence at a lower water vapor pressure than the relatively warmer seawater introduced into the evaporation chamber 24.

The water vapor contacting the ice in these chambers condenses and also melts the ice, thereby producing fresh water. Water is drained from the bottom of the condensation chamber 17 through a heat exchanger 29 for use as potable water.

The conduit 30 from the bottom of the condensation chamber to the heat exchanger 29 is sufficiently high above its outlet that it will support a head of water corresponding to at least one atmosphere pressure for maintaining a low pressure within the condensation chamber.

The first water produced in the vacuum freezing chamber 10 by condensation of water vapor and melting of ice percolates down through the bed of ice accumulated in the chamber and passes out through the brine discharge conduit 12. When the salt content of the discharge water drops to an acceptable level, the valve 13 is closed and a second valve 31 is opened to discharge fresh water through a conduit 32 and heat exchanger 33. The length of the conduit 32 above its outlet is sufficiently high that it supports a head of water at least corresponding to one atmosphere pressure for maintaining a low pressure in the chambers. When all of the ice in chambers 10 and 17 is melted, flow of warmer seawater is stopped and the system returned to the first described operation with precooled seawater sprayed into the freezer chamber 10.

Incoming seawater SW into the vacuum freezing chamber 10 is pumped through heat exchangers 14, 22, 28, 29 and 33 enroute to the flash nozzle 11. The various heat exchangers have been indicated only schematically herein and the general concept of flow through heat exchangers has been indicated by arrows only for purposes of conveying the concept that the refrigeration potential of cold potable water, cold brine and natural gas are utilized for cooling the incoming seawater. It will be apparent to one skilled in the art that the specific arrangement or sequence of heat exchangers illustrated in this embodiment is merely for convenience of illustration and, in an operating system, the heat exchangers are arranged for optimum countercurrent flow with the relatively warmer seawater first being in contact with the warmest discharge product and the coldest seawater being in heat transfer relation with the coldest discharge product. Thus, the various heat exchangers illustrated may be arranged in any of a variety of patterns in either serial or parallel paths or both.

An advantage of having a pair of batch-type apparatus operated in alternation arises in the opportunity for efficient precooling of the seawater. Thus, the coldest effluent from the half of the system melting fresh water may be employed for precooling seawater going into the half of the system wherein evaporation and freezing is occurring.

Another advantage is that provided by supplemental refrigeration for heat transfer between the two halves of the system. Thus, for example, a refrigeration coil 35, 35' may be provided in the condensation chamber 17, 17' in each half of the system with a conduit 36 therebetween. Such a refrigeration system may be charged with dichlorodifluoromethane (Freon-12) or the like, which at a suitable pressure, undergoes phase change between the liquid and gaseous states in the temperature operating range of the apparatus. Liquefaction of the Freon-12 may assist melting and evaporation of Freon-12 assists freezing in the respective chambers. Mass flow between the two refrigeration coils 35, 35' may occur due to temperature difference alone or may be augmented by a reversible pumping system if desired.

The energy requirements in the described system are relatively small since it is only necessary to pump seawater to the elevation of the top of the apparatus where it flows through the nozzles 11 or 26 into the respective chambers. When low pressure is maintained in the chambers by the hydraulic leg in the conduits beneath the chambers, flow through the nozzles can be relatively high velocity because of the pressure gradient. Energy is of course required for the vacuum pumps 16, for a seawater deaerator (not shown), and for other auxiliary apparatus. When liquefied natural gas is employed as the source of refrigeration, the kinetic energy produced by expansion of the gas is sufficient to operate the plant. Thus, for example, when 500 million cubic feet of gas per day are vaporized and expanded, about 6 million gallons of water per day is produced. The largest power requirement is for pumping the seawater and any surplus power from gas expansion may be employed for additional refrigeration to increase freezing capacity and hence yield of fresh water.

It will also be understood by one skilled in the art that many accessory elements vital to the performance of the system have been omitted from the schematic illustration of the drawing since their application is of a conventional nature and the details of which are not needed for an understanding of this invention. Thus, a broad variety of valves, pressure controllers, temperature controllers, level controls, flow meters and the like will be employed in practice of this invention as required to obtain the desired performance.

Although but one embodiment of evaporative desalination apparatus constructed according to principles of this invention has been described and illustrated herein, many modifications and variations will be apparent to one skilled in the art. It is therefore to be understood that within the scope of the appended claims, the invention may be practiced otherwise than as specifically described.

What is claimed is:

1. A process for recovering potable water from saline water comprising the steps of:
   introducing relatively cooler saline water into a low pressure chamber for forming water vapor, ice and cold brine;
   continuously freezing water vapor to form ice during the introducing step;
   separating the ice formed in the introducing step from the cold brine;
   introducing relatively warmer saline water into the low pressure chamber for forming water vapor and cold brine; and
   contacting water vapor from the second introducing step on ice from the first introducing step and the freezing step for condensing water vapor and melting ice.

2. A process as defined in claim 1, further comprising the step of precooling saline water prior to the first introducing step by heat transfer to cold brine and fresh water.

3. A process for recovering potable water from saline water comprising the steps of:
   introducing relatively cooler saline water into a low pressure chamber for forming water vapor, ice and cold brine;
   continuously freezing water vapor to form ice during the introducing step;
   separating the ice formed in the introducing step from the cold brine;
   introducing relatively warmer saline water into a low pressure chamber for forming water vapor and cold brine;
   contacting water vapor from the second introducing step on ice from the first introducing step and the freezing step for condensing water vapor and melting ice;
   operating the above defined process in each of two apparatus with the first introducing step and freezing step being conducted in one apparatus and the second introducing step and contacting step being conducted in the other apparatus in alternation with each other; and
   precooling saline water prior to the first introducing step in one apparatus with effluent from the other apparatus.

4. A process as defined in claim 1, wherein the freezing step comprises bringing cold natural gas into heat transfer relation with water vapor.

5. A process as defined in claim 4, further comprising the step of expanding natural gas through a turbine for recovering potential energy of expansion thereof.

6. A process for recovering potable water from saline water comprising the steps of:
   introducing relatively cooler saline water into a low pressure chamber for forming water vapor, ice and cold brine;

continuously freezing water vapor to form ice during the introducing step;

separating the ice formed in the introducing step from the cold brine;

introducing relatively warmer saline water into a low pressure chamber for forming water vapor and cold brine;

contacting water vapor from the second introducing step on ice from the first introducing step and the freezing step for condensing water vapor and melting ice; and maintaining a low pressure in the chambers by withdrawing water and brine through hydraulic legs each having a height above its outlet equivalent to a head of water corresponding to at least 1 atmosphere pressure.

7. Desalination apparatus comprising:

means for cooling saline water;

a first chamber;

a second chamber in vapor communication with the first chamber;

a third chamber in vapor communication with the second chamber;

means for lowering pressure in the chambers;

means for intermittently introducing relatively cooler saline water into the first chamber for forming water vapor, ice and cold brine;

means for collecting ice in the first chamber and removing brine therefrom;

means for intermittently condensing ice from water vapor in the second chamber;

means for intermittently introducing relatively warmer saline water in the third chamber for forming water vapor and brine in alternation with introduction of cooler saline water in the first chamber; and means for recovering fresh water from the first and second chambers as water vapor condenses on ice therein.

8. Desalination apparatus as defined in claim 7, wherein the means for condensing ice comprises heat exchange conduits in the second chamber and means for passing cold natural gas through the conduits.

9. Desalination apparatus as defined in claim 8, further comprising means for expanding natural gas for recovering shaft horsepower.

10. Desalination apparatus comprising:

means for cooling saline water;

a first chamber;

a second chamber in vapor communication with the first chamber;

a third chamber in vapor communication with the second chamber;

means for lowering pressure in the chambers;

means for intermittently introducing relatively cooler saline water into the first chamber for forming water vapor, ice and cold brine;

means for collecting ice in the first chamber and removing brine therefrom;

means for intermittently condensing ice from water vapor in the second chamber;

means for intermittently introducing relatively warmer saline water in the third chamber for forming water vapor and brine in alternation with introduction of cooler saline water in the first chamber;

means for recovering fresh water from the first and second chambers as water vapor condenses on ice therein; and liquid conduits below the chambers sufficiently high above their respective outlets to equal the head of water corresponding to one atmosphere pressure for maintaining a low pressure in the chambers.

11. Desalination apparatus comprising:

means for cooling saline water;

a first chamber;

a second chamber in vapor communication with the first chamber;

a third chamber in vapor communication with the second chamber;

means for lowering pressure in the chambers;

means for intermittently introducing relatively cooler saline water into the first chamber for forming water vapor, ice and cold brine;

means for collecting ice in the first chamber and removing brine therefrom;

means for intermittently condensing ice from water vapor in the second chamber;

means for intermittently introducing relatively warmer saline water in the third chamber for forming water vapor and brine in alternation with introduction of cooler saline water in the first chamber;

means for recovering fresh water from the first and second chambers as water vapor condenses on ice therein;

a fourth chamber like the first chamber;

a fifth chamber like the second chamber and in vapor communication with the fourth chamber;

a sixth chamber like the third chamber and in vapor communication with the fifth chamber;

means for lowering pressure in the fourth, fifth and sixth chambers;

means for intermittently producing relatively colder saline water into the fourth chamber for forming water vapor, ice and cold brine;

means for collecting ice in the fourth chamber and removing brine therefrom;

means for intermittently condensing ice from water vapor in the fifth chamber;

means for intermittently introducing relatively warmer saline water in the sixth chamber for forming water vapor and brine in alternation with introduction of cooler saline water in the fourth chamber;

means for recovering fresh water from the fourth and fifth chambers as water vapor condenses on ice therein; and means for operating the means for introducing saline water into the first chamber and means for introducing saline water in the sixth chamber during one interval, and for operating the means for introducing saline water in the fourth chamber and means for introducing saline water in the third chamber during another interval.

12. Desalination apparatus as defined in claim 11, further comprising:

a reversible refrigeration system having a first heat transfer means in the second chamber for receiving or discharging heat and second heat transfer means in the fourth chamber for discharging or receiving heat, respectively.

13. A desalination apparatus as defined in claim 11, further comprising:
heat exchange means for transferring heat between effluent from the first, second, and third chambers and the saline water introduced in the fourth chamber; and
heat exchange means for transferring heat between effluent from the fourth, fifth, and sixth chambers and saline water introduced into the first chamber.

* * * * *